US 8,899,410 B2

(12) United States Patent
Brayman et al.

(10) Patent No.: US 8,899,410 B2
(45) Date of Patent: Dec. 2, 2014

(54) CONVEYOR UNDERGUARD

(71) Applicant: Dematic Corp., Grand Rapids, MI (US)

(72) Inventors: Matthew T. Brayman, Ada, MI (US); Samuel A. Sheffer, Rockford, MI (US); Percy Vreeken, Grosse Pointe Farms, MI (US); Nick Pomante, Harrison Township, MI (US); Randy Eschenburg, New Baltimore, MI (US); Timothy J. Nixon, Washington, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 14/208,992

(22) Filed: Mar. 13, 2014

(65) Prior Publication Data

US 2014/0262700 A1   Sep. 18, 2014

Related U.S. Application Data

(63) Continuation-in-part of application No. 13/837,901, filed on Mar. 15, 2013, now abandoned.

(60) Provisional application No. 61/887,025, filed on Oct. 4, 2013.

(51) Int. Cl.
  *B65G 21/08* (2006.01)
  *B65G 21/00* (2006.01)

(52) U.S. Cl.
  CPC ..................... *B65G 21/00* (2013.01)
  USPC ................... 198/860.3; 198/860.1; 198/861.1

(58) Field of Classification Search
  USPC ................ 198/860.1, 860.3, 861.1
  See application file for complete search history.

(56) References Cited

U.S. PATENT DOCUMENTS

| 1,949,817 A | 3/1934 | Stonefield et al. |
| 2,433,772 A | 12/1947 | Lyons |

(Continued)

OTHER PUBLICATIONS

Information pertaining to inventorship of the various claims and lack of obligation to assign. Discussed in transmittal letter.

(Continued)

*Primary Examiner* — Douglas Hess
(74) *Attorney, Agent, or Firm* — Gardner, Linn, Burkhart & Flory, LLP

(57) ABSTRACT

A conveyor underguard that is adapted for use with a conveyor having a pair of spaced apart side channels, each having a lower flange and a plurality of openings on each flange, includes a guard surface and a pair of mounting members, each extending outwardly generally parallel to the guard surface and defining fastener openings. The fastener openings are spaced apart in a manner that aligns with the through-openings of the conveyor. A pair of side members connect the guard surface with the mounting members in a manner that offsets the guard surface from the mounting members away from each flange. The conveyor underguard is defined by a polymeric material body having a planar body pan integrally connected to opposed first and second side walls and to first and second end walls. A first side flange is integrally connected to the first side wall and extends for an entire length of the first side wall. A second side flange is integrally connected to the second side wall and extends for an entire length of the second side wall. Multiple mounting flanges are integrally connected to and extend away from each of the first and second side flanges. Each of the mounting flanges has an elongated aperture. Multiple equally spaced and parallel slots are created in a surface of the body pan.

27 Claims, 9 Drawing Sheets

(56) References Cited

U.S. PATENT DOCUMENTS

| | | | |
|---|---|---|---|
| 3,322,251 A | | 5/1967 | Whitfield |
| 3,944,054 A | * | 3/1976 | Ensinger ................... 198/860.3 |
| 4,674,626 A | * | 6/1987 | Adcock ........................ 198/811 |
| 4,819,790 A | * | 4/1989 | Adcock ........................ 198/811 |
| 5,078,250 A | | 1/1992 | Cole |
| 5,277,246 A | * | 1/1994 | Monch ......................... 165/120 |
| 5,400,897 A | * | 3/1995 | Doyle .......................... 198/496 |
| 6,000,529 A | | 12/1999 | Layne et al. |
| 6,062,377 A | * | 5/2000 | Mensch ....................... 198/811 |
| 6,510,941 B2 | * | 1/2003 | Schermutzki et al. ..... 198/836.1 |
| 7,284,658 B2 | | 10/2007 | Wiggins et al. |
| 7,694,805 B2 | * | 4/2010 | Schneider et al. ......... 198/836.1 |
| 8,033,388 B2 | | 10/2011 | Russell |
| 8,474,608 B2 | | 7/2013 | Piacenti et al. |
| 8,590,697 B2 | | 11/2013 | Lim et al. |
| 8,607,968 B2 | | 12/2013 | Mott et al. |
| 2009/0218199 A1 | | 9/2009 | Russell |
| 2012/0125744 A1 | | 5/2012 | Piacenti et al. |
| 2013/0299313 A1 | | 11/2013 | Baek, IV et al. |

OTHER PUBLICATIONS

International Search Report (Form PCT/ISA/210) and Written Opinion of the International Searching Authority (Form PCT/ISA/237) from corresponding Patent Cooperation Treaty Application No. PCT/US2014/026012, mailed Jul. 18, 2014.

* cited by examiner

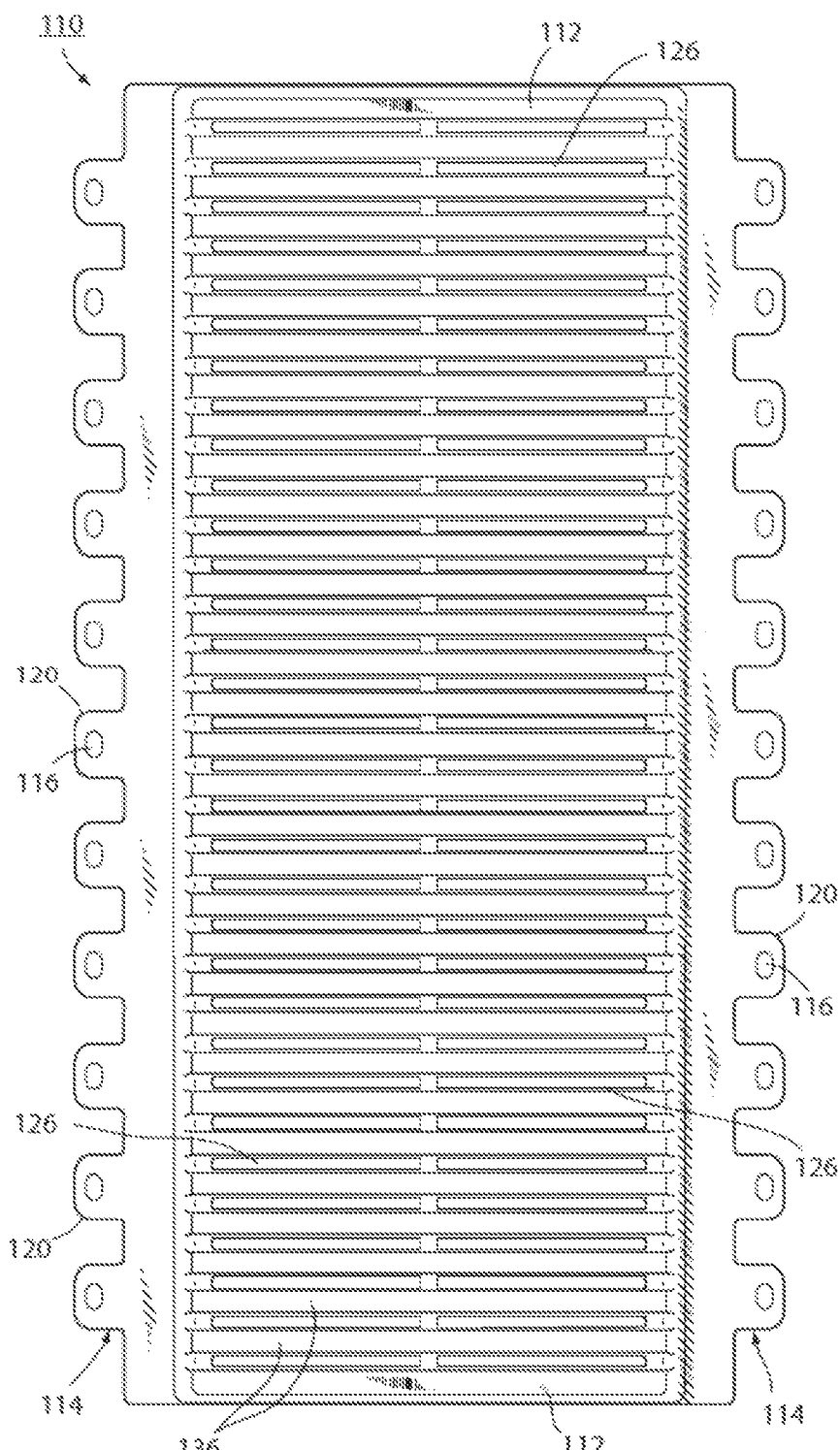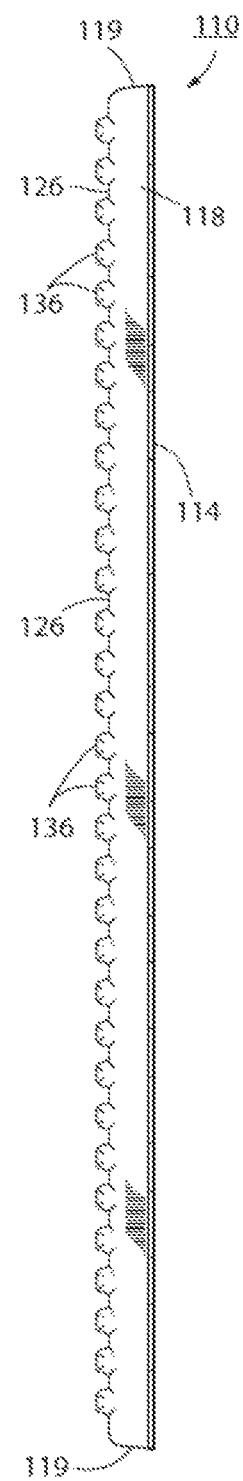
FIG. 9
FIG. 10
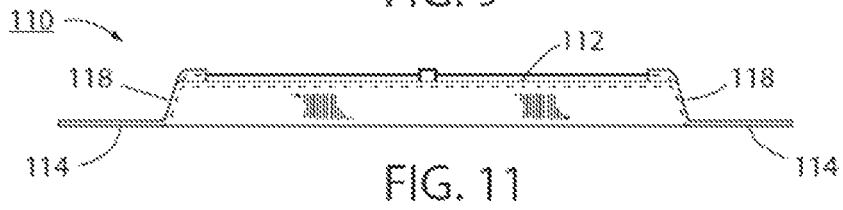
FIG. 11

CONVEYOR UNDERGUARD

CROSS REFERENCE TO RELATED APPLICATION

This is a continuation-in-part application of U.S. patent application Ser. No. 13/837,901, filed on Mar. 15, 2013 (Abandoned, Apr. 18, 2014), and U.S. provisional patent application Ser. No. 61/887,025, filed on Oct. 4, 2013, the disclosures of which are hereby incorporated herein by reference.

FIELD

The present disclosure relates to conveyor systems and guards used for conveyor systems.

BACKGROUND

This section provides background information related to the present disclosure which is not necessarily prior art.

Conveyors used in industrial applications have multiple rotating rollers which are either powered for rotation or have bearings that permit rotation to permit displacement of products from one location to a second location. Multiple electrical system components used to monitor and/or power the conveyors are provided in front of or under the conveyor. Guards currently known to mitigate against an operator reaching into the mechanisms and/or electrical components of the conveyor commonly are metal mesh or a non-reinforced plastic film material. Known conveyor guards are not adaptable for interchangeable use in multiple locations, are heavy and expensive when constructed of metal, and have short lifespans due to damage, for example from falling objects when constructed of plastic film.

SUMMARY

This section provides a general summary of the disclosure, and is not a comprehensive disclosure of its full scope or all of its features.

A conveyor guard that is adapted for use with a conveyor having a pair of spaced apart side channels, each having a lower flange and a plurality of openings on each flange, according to an aspect of the invention, includes a guard surface and a pair of mounting members, each extending outwardly generally parallel to the guard surface and defining fastener openings. The fastener openings are spaced apart in a manner that aligns with the openings of the conveyor. A pair of side members connect the guard surface with the mounting members in a manner that offsets the guard surface from the mounting members away from each flange.

A conveyor underguard, according to another aspect of the invention, includes a polymeric material body having a generally planar body pan integrally connected to opposed first and second side walls and to first and second end walls. A first side flange is integrally connected to the first side wall and extends for an entire length of the first side wall. A second side flange is integrally connected to the second side wall and extends for an entire length of the second side wall. Multiple mounting flanges are integrally connected to and extend away from each of the first and second side flanges. Each of the mounting flanges has an elongated aperture. Multiple equally spaced and parallel slots are created in a surface of the body pan.

According to yet another aspect of the invention, a V-shaped slot defines an intersection of each mounting flange and an outer edge of either the first or second side flange. Any of the mounting flanges is removable by repeated bending or by cutting at the V-shaped slot.

According to further aspects, each elongated aperture includes opposed first and second end wall raised ribs and opposed first and second side wall raised ribs.

According to still further aspects, a raised ring is provided about a perimeter of the elongated aperture of each of the mounting flanges. The raised ring provides tactile feedback during installation of a fastener when the raised ring begins to compress.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is a bottom plan view of the conveyor underguard in FIG. 8;

FIG. 10 is a side elevation view of the conveyor underguard in FIG. 9; and FIG. 11 is an end elevation view of the conveyor underguard in FIG. 9.

Corresponding reference numerals indicate corresponding parts throughout the several views of the drawings.

DETAILED DESCRIPTION

Example embodiments will now be described more fully with reference to the accompanying drawings.

Figure 1:
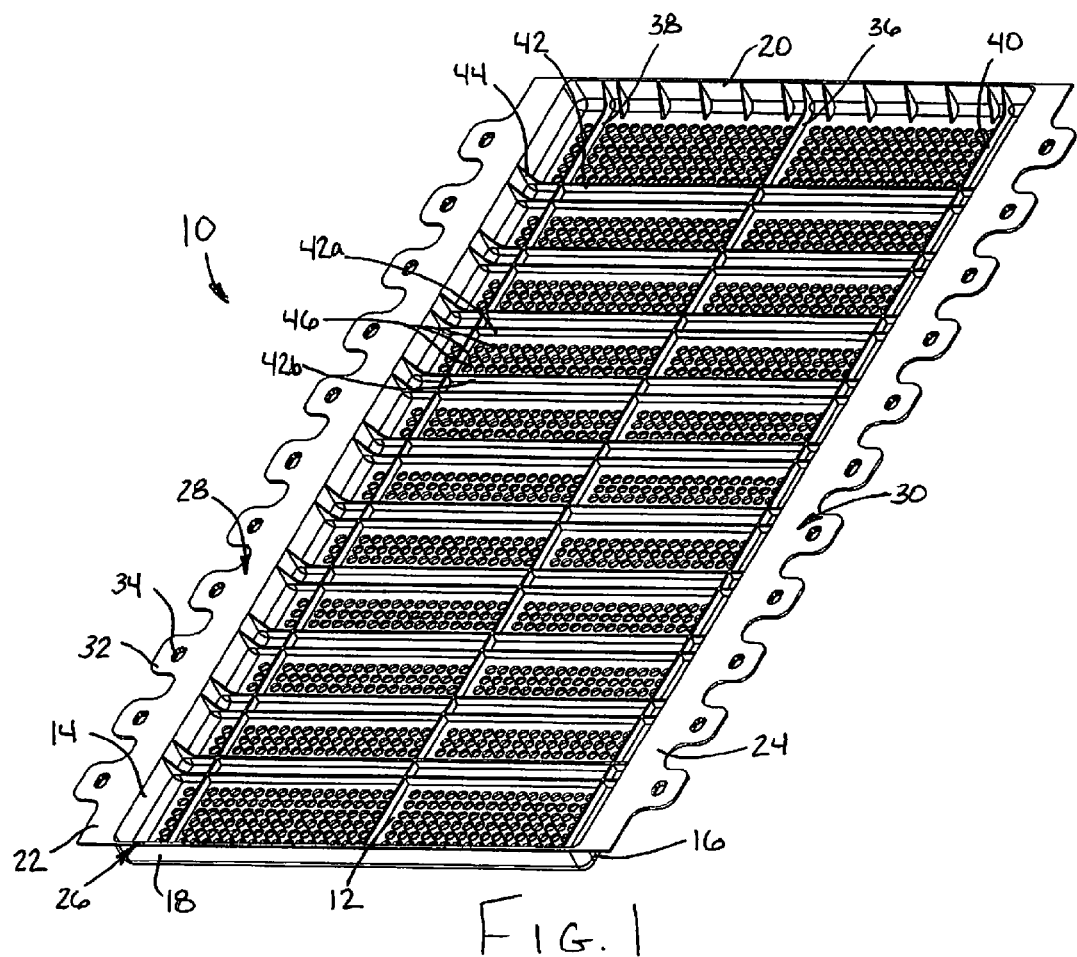
FIG. 1 is a top perspective view of a conveyor underguard of the present disclosure.
Figure 1A:
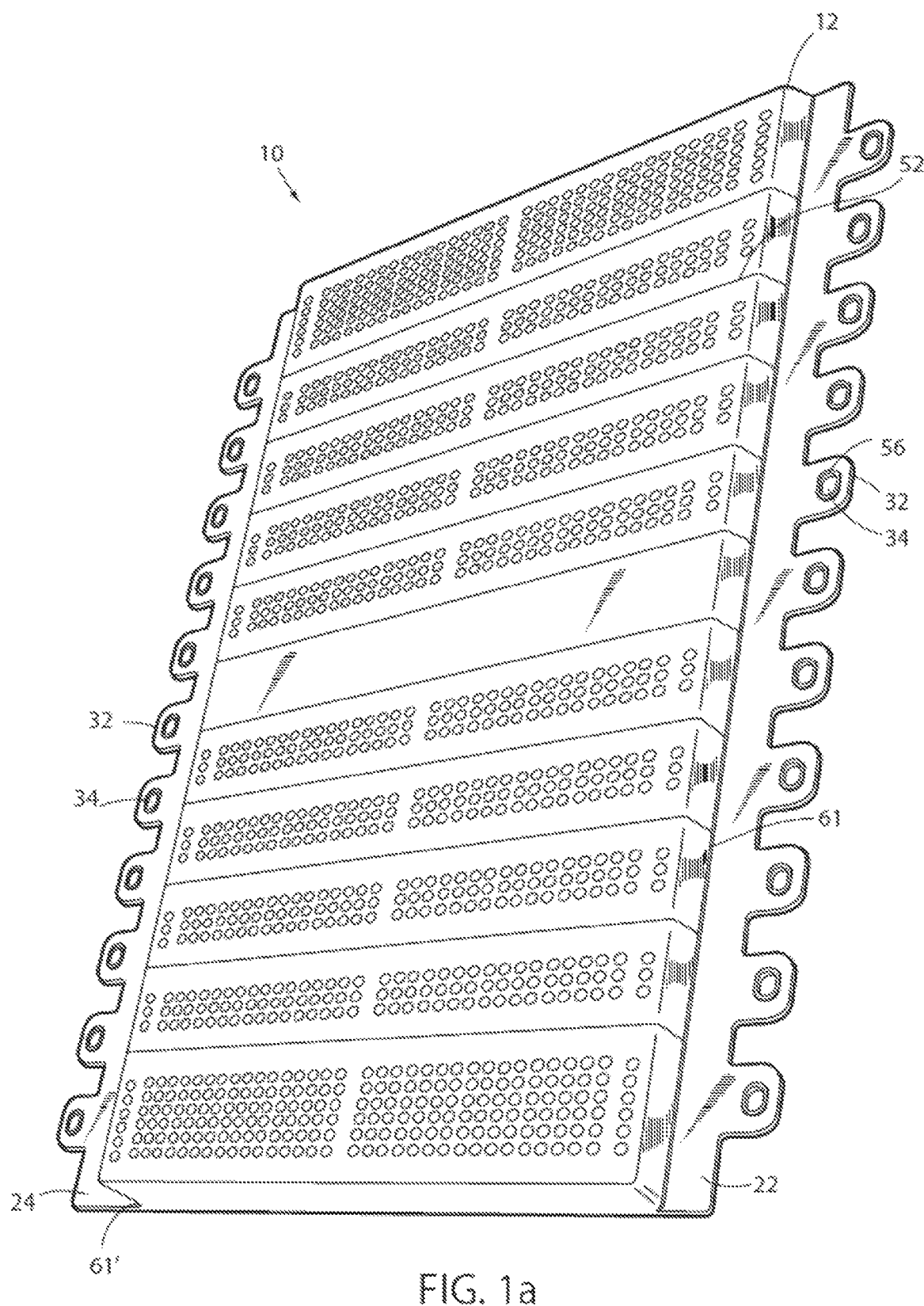
FIG. 1a is a bottom perspective view of the conveyor underguard in FIG. 1.

Referring to FIG. 1a, a conveyor underguard 10 includes a polymeric material body having a generally planar body pan 12 which defines a guard surface 11 is integrally connected to opposed first and second side walls 14, 16, and to first and second end walls 18, 20. A first side flange 22 is integrally and frangibly connected to the first side wall 14 and extends for an entire length of the first side wall 14. Similarly, a second side flange 24 is integrally and frangibly connected to the second side wall 16 and extends for an entire length of the second side wall 16. The first side flange 22 is flush with respect to an upper perimeter surface 26 of the first and second side walls 14, 16 and the first and second end walls 18, 20. Together, the first and second side flanges 22, 24 define co-planar surfaces 28, 30 which are co-planar with respect to upper perimeter surface 26.

Figure 6:
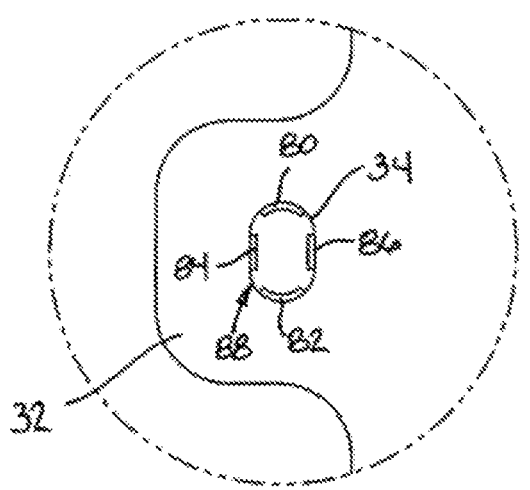
FIG. 6 is a top plan view of a mounting flange from area 6 of FIG. 3.
Figure 7:
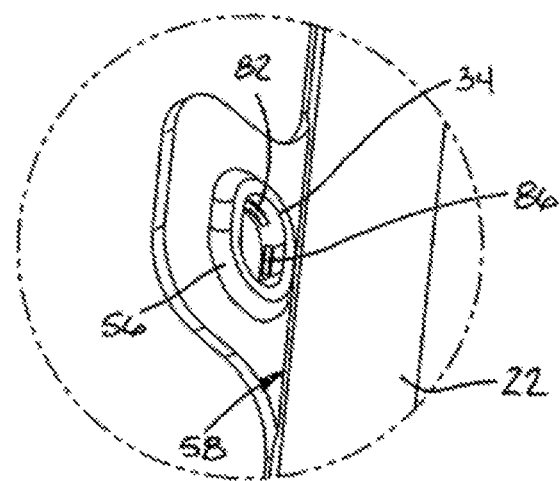
FIG. 7 is a top perspective view of the mounting flange of FIG. 6.
Figure 8:
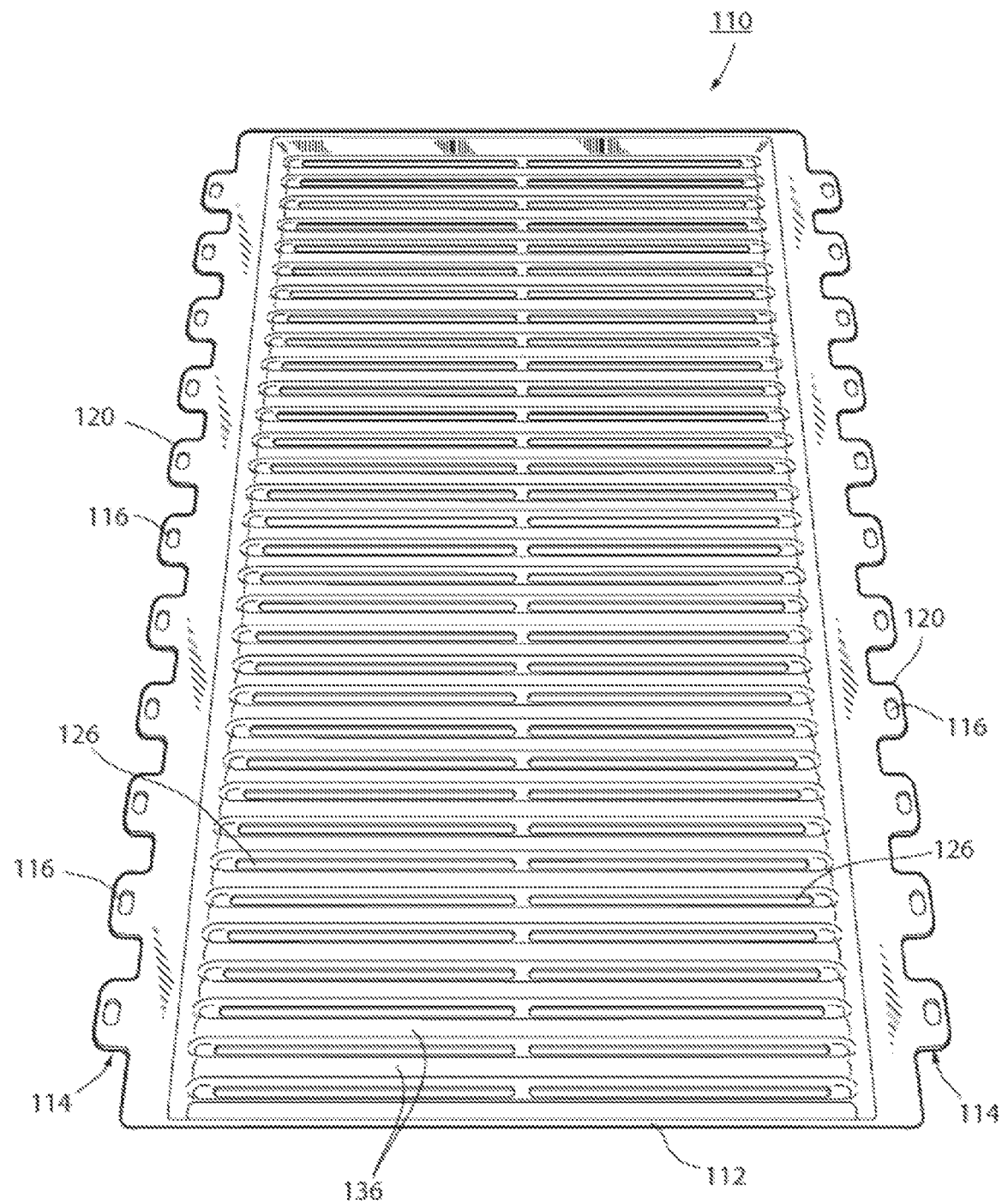
FIG. 8 is a top perspective view of a conveyor underguard according to another embodiment.

Multiple mounting flanges 32 are integrally and frangibly connected to and extend away from each of the first and second side flanges 22, 24. Each mounting flange 32 includes an elongated aperture 34 which will be described in greater detail in reference to FIGS. 6 and 7. The body pan 12 can include a longitudinal center rib 36 which is integrally connected to and extends upwardly from body pan 12 for a height which is less than a height of any of the first and second side walls 14, 16 or of the first and second end walls 18, 20. Center rib 36 extends for an entire length of body pan 12 and is integrally connected to each of the first and second end walls 18, 20. Similarly sized first and second side ribs 38, 40 can also be provided in body pan 12, which are constructed the same as center rib 36.

Multiple cross ribs 42 are also integrally connected to body panel 12, and are similar in geometry to center rib 36, but are each oriented normal with respect to center rib 36. Each of the cross ribs 42 are integrally connected at opposite ends to the first and second side walls 14, 16. Besides providing stiffness to the body pan, the cross ribs serve as flow channels to allow the fluid plastic to flow more easily especially around apertures 46 which will be described in more detail below. A gusset 44 is integrally connected at the end of each of the center rib 36, first and second side ribs 38, 40 and the cross ribs 42 where these ribs are integrally connected with individual ones of the walls of body pan 12. The gussets 44 provide several functions including: 1) to provide stiffness at the intersections of the walls and the body pan 12; and 2) the gussets 44 of the cross ribs 42 provide wall structure if the body pan 12 is cut proximate to any of the cross ribs 42, which is described in greater detail in reference to FIGS. 3 and 4.

Positioned between any two of the cross ribs 42, such as between cross ribs 42a, 42b are a plurality of apertures 46. Apertures 46 reduce the weight of conveyor underguard 10 as well as the cost by minimizing the amount of resin required to mold conveyor underguard 10. Also, the apertures allow debris to pass through the guard surface 11 so that cardboard dust, and the like, is not allowed to build up on the interior surface portion of the guard surface.

Figure 2:
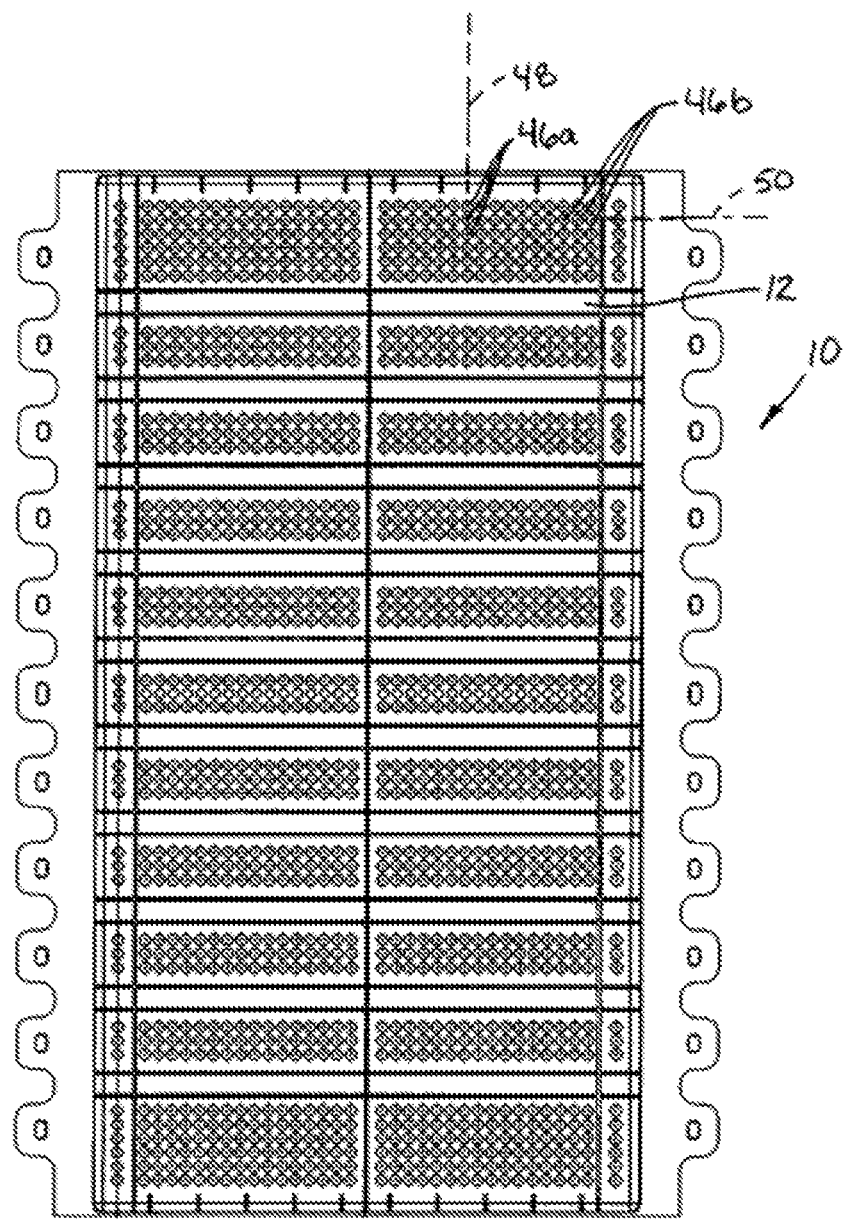
FIG. 2 is a top plan view of the conveyor underguard of FIG. 1.

Referring to FIG. 2 and again to FIG. 1, individual groups of apertures 46 are arranged in longitudinal columns such as apertures 46a provided in a column 48. Similarly, individual groups of apertures 46 are arranged in longitudinal rows such as apertures 46b provided in a row 50. The columns 48 and rows 50 provide maximized use of apertures 46, while maintaining structural integrity of body pan 12.

Figure 3:
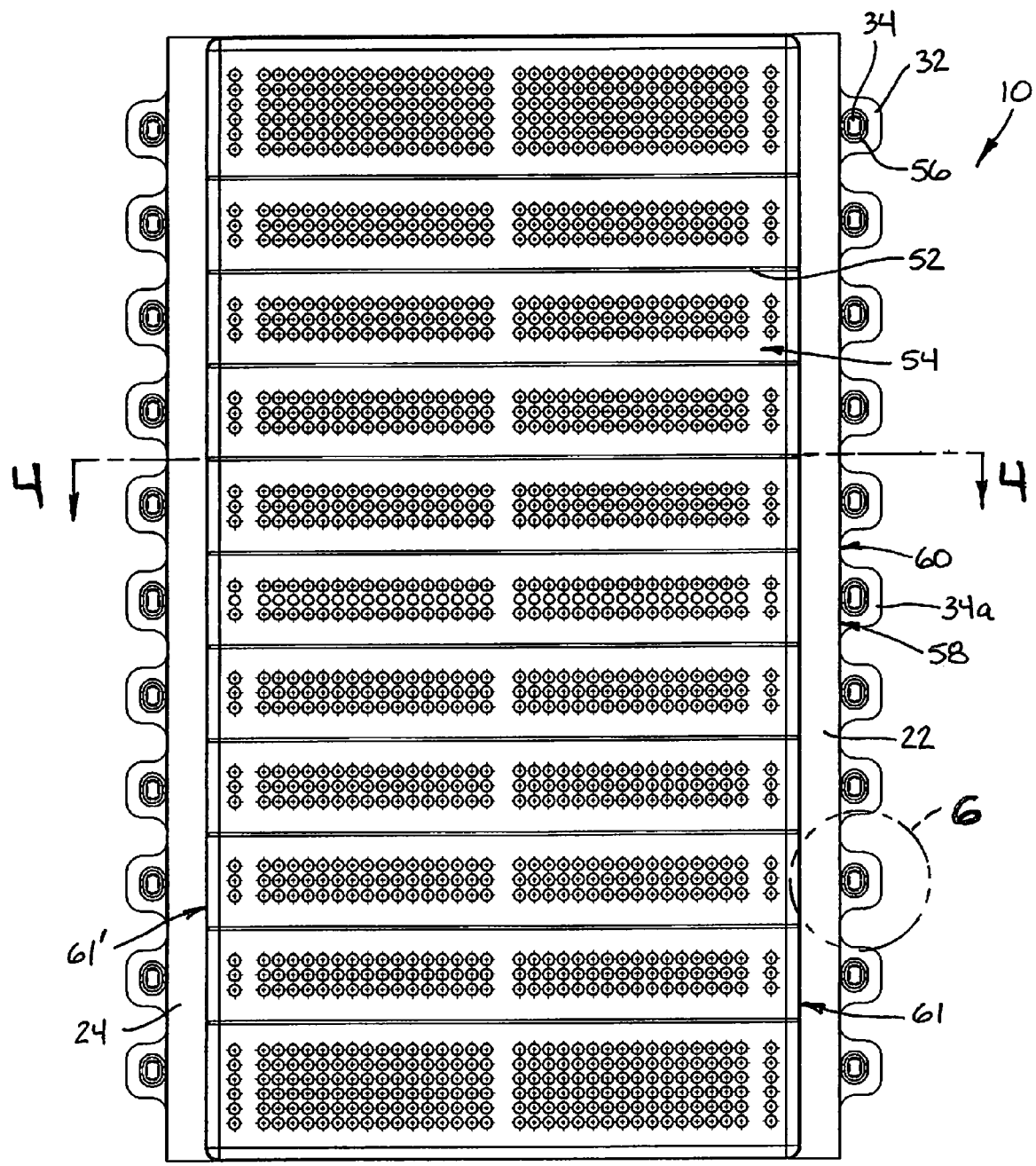
FIG. 3 is a bottom plan view of the conveyor underguard of FIG. 1.

Referring to FIG. 3, a length of body pan 12 can be changed to suit the space requirements of conveyor system without negatively impacting the structural integrity of conveyor underguard 10. To provide specific locations at which to cut conveyor underguard 10, multiple equally spaced and parallel notches or slots 52 are created in a bottom surface 54 of body pan 12. The slots 52 provide a visual guide for a location to cut body pan 12 when it is desirable to reduce a length of body pan 12.

It is further noted that a raised ring 56 is provided about the perimeter of each elongated aperture 34 of the mounting flanges 32. The purpose of the raised rings 56 will be better described in reference to FIGS. 5 and 7. Each of the mounting flanges 32 are individually frangible and can be individually removed from their respective first or second side flange 22, 24. To aid in the removal of individual mounting flanges 32, a V-shaped slot 58 is created at the intersection of each mounting flange 32 and an outer edge 60 of either the first or second side flange 22, 24. By repeated bending or by cutting the mounting flange 32 at the V-shaped slot 58, any of the mounting flanges 32 that are removed leave the outer edge 60 straight and smooth.

In addition to the V-shaped slots 58, the entire first side flange 22 or second side flange 24 are frangible and can be removed by separation at first and second elongated slots 61, 61' defining a junction between first side flange 22 and body pan 12 and between second side flange 24 and body pan 12. By repeated bending or by cutting the first side flange 22 or the second side flange 24 at the elongated slot 61, 61', a portion of or all of first side flange 22 or the second side flange 24 can be removed.

Referring to FIG. 4 and again to FIGS. 1 and 3, if the body pan 12 is cut along any of the slots 52 and the cut is extended through the first and second side flanges 22, 24, the geometry of FIG. 4 is provided. Each of the gussets 44 of the exemplary cross rib 42b, as well as the cross rib 42b itself create a reduced size end wall, thereby acting similar to and thereby replacing the removed one of the first or second end walls 18, 20. The end of the body pan 12 created by cutting at one of the slots 52 therefore does not significantly reduce the structural integrity of the body pan 12 at the proximate cross rib 42.

Referring to FIG. 5 and again to FIGS. 1 and 3, conveyor underguard 10 is presented in a typical installation to a conveyor system 62. Conveyor system 62 includes multiple rollers 64 (only one of which is shown for clarity) which are rotatably supported at opposite ends to first and second channel members 66, 68. Each channel member 66 or 68 includes an upright member 70, 70' to which is connected the roller 64, and at least a lower flange 72, 72' to which is connected the mounting flanges 32 of one of the first or second side flanges 22, 24. A fastener 74 (only one shown for clarity) such as a bolt has its fastener head positioned in contact with the raised ring 56 of one of the mounting flanges 32 and its threaded shank 76 extending through the elongated aperture 34 and the lower flange 72 (such as lower flange 72' shown). A connecting fastener 78 such as a nut is fixed to threaded shank 76 and the fastener assembly is torqued until the operator "feels" the raised ring 56 begin to compress or collapse. This tactile indication provides a repeatable and substantially equal torque for each of the fastener assemblies.

Figure 5:
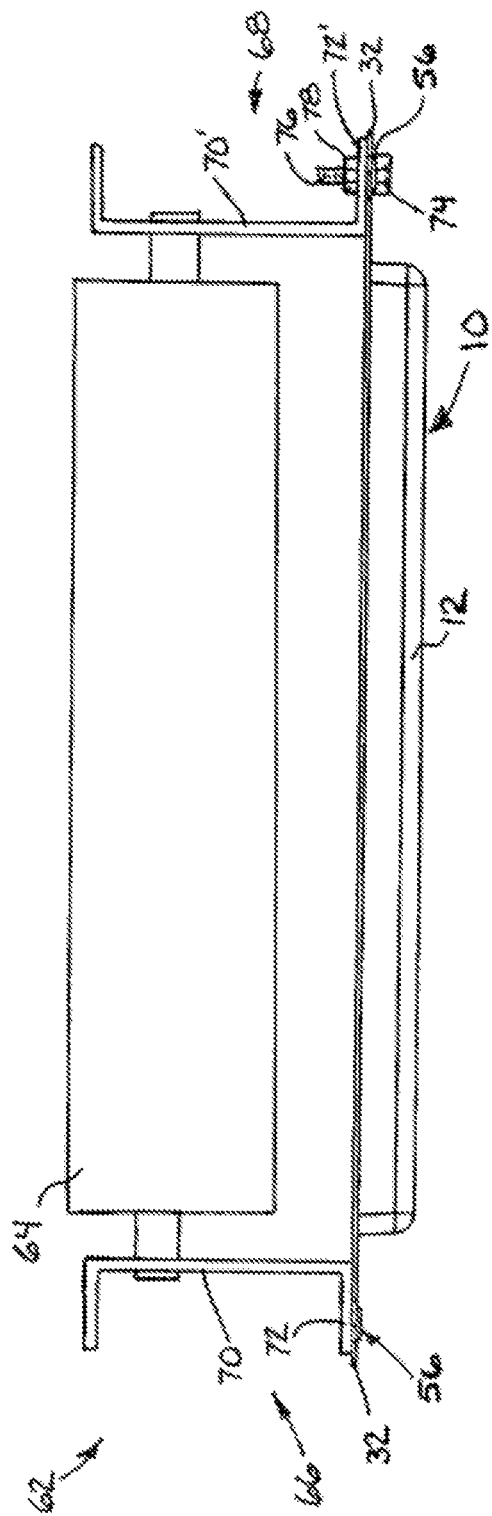
FIG. 5 is an end elevational view of a conveyor underguard installed in an exemplary conveyor system.

When the conveyor underguard 10 is installed as shown in FIG. 5 to an underside of the conveyor system 62, the body pan 12 extends fully across the span between the channel members 66, 68 and prevents personnel from reaching beneath the rollers 64, or into the underside components that may also be installed on conveyor system 62. Body pan 12 also acts to capture light weight objects that fall between any of the rollers 64.

Figure 4:
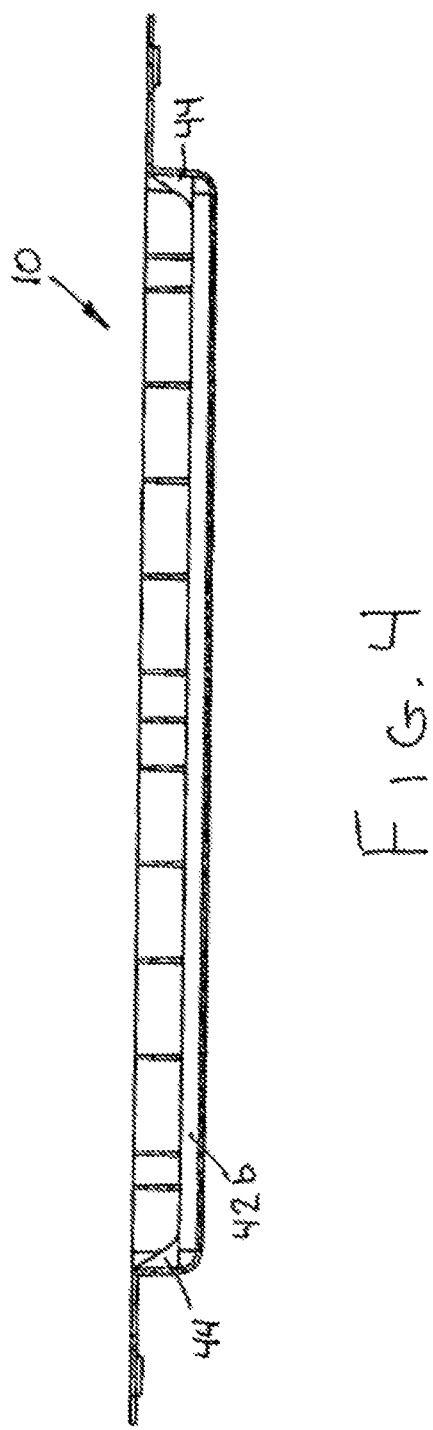
FIG. 4 is a cross sectional end elevational view taken at section 4 of FIG. 3.

Referring to FIGS. 6 and 7, and again to FIGS. 4 and 5, each of the elongated apertures 34 is provided with opposed first and second end wall raised ribs 80, 82 and opposed first and second side wall raised ribs 84, 86. The end wall raised ribs 80, 82 extend toward each other with respect to an inner wall 88 of the elongated aperture 34. Similarly, the first and second side wall raised ribs 84, 86 extend toward each other with respect to the inner wall 88. Each of the first and second side wall raised ribs 84, 86 are frictionally contacted by the threaded shank 76 of the fastener 74 and at least one of the first or second end wall raised ribs 80, 82 can also be frictionally contacted by the threaded shank 76. This frictional contact temporarily retains the fastener 74 within the elongated aperture 34, such that multiple ones of the fasteners 74 can be installed in conveyor underguard 10 and the entire assembly of conveyor underguard 10 together with the multiple fasteners 74 can be moved into position under the conveyor system 62. The elongated apertures 34 are spaced in a predetermined spacing pattern that corresponds to a spacing pattern of apertures created in the lower flanges 72 of the conveyor system 62. The pre-installed set of fasteners 74 in conveyor guard 10 therefore axially align with individual ones of the conveyor system lower flange apertures to simplify the installation of conveyor guard 10.

The raised rings 56 of the mounting flanges 32 provide additional material and stiffness to accommodate the first and second end wall raised ribs 80, 82 and the first and second side wall raised ribs 84, 86. In addition, as previously noted, raised rings 56 also provide a tactile feedback during torqueing of the fasteners 74.

An alternative embodiment of a conveyor underguard 110 includes a guard surface 112 and mounting members 114 each defining a series of spaced apart fastener openings 116 that align with fastener-engaging openings in the bottom flanges of the conveyor side channel (not shown). Fasteners (not shown) pass through-openings 116 to engage the openings in the bottom flanges of the conveyor side channel. Side members 118 space guard surface 112 from mounting members 114 and thereby away from the bottom of the conveyor. Mounting members 114 are each defined by a series of spaced apart tabs 120 each defining a fastener opening 116. Guard surface 112 is defined by a plurality of lateral ribs 136 that are spaced apart thereby defining passages 126 that allow debris to fall through guard surface 112. An end wall 119 spans between side members 118. Spaced apart lateral score lines (not shown) may be spaced along guard surface 112 to allow the guard to be divided into sections as with conveyor guard 12. Also, score lines may be provided along the base of each tab 120 to allow tabs 120 to be individually removed to accommodate conveyor legs or other obstacles. Conveyor guard 110 may be made by thermo forming. Thermo forming results in a higher part cost, but a lower mold cost. Thus, it is ideal for low volume sizes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A conveyor underguard that is adapted for use with a conveyor having a pair of spaced apart side channels, each having a lower flange and a plurality of openings on each said flange, said conveyor underguard comprising:
    a guard surface;
    a pair of mounting members, each extending outwardly generally parallel to said guard surface and defining fastener openings, said fastener openings being spaced apart in a manner that aligns with the openings of the conveyor; and
    a pair of side members, said side members connecting said guard surface with said mounting members in a manner that offsets said guard surface from said mounting members away from each flange.

2. The conveyor underguard as claimed in claim 1 wherein each of said mounting members is defined by a plurality of tabs, each defining one of said fastener openings.

3. The conveyor underguard as claimed in claim 2 wherein at least some of said tabs are frangibly joined with one said side member and adapted to be snapped off to accommodate obstructions.

4. The conveyor underguard as claimed in claim 1 that is divided into a plurality of frangibly joined portions, each adapted to be removed from an adjacent section.

5. The conveyor underguard as claimed in claim 4 wherein the portions are adapted to be removed by a score line.

6. The conveyor underguard as claimed in claim 1 including lateral ridges extending across said guard surface.

7. The conveyor underguard as claimed in claim 6 wherein at least some of said lateral ridges are closely spaced and including lateral score lines, each positioned between a pair of closely spaced lateral ridges.

8. A conveyor underguard, comprising:
    a body pan integrally connected to opposed first and second side walls and to first and second end walls;
    a first side flange integrally connected to the first side wall and extending for an entire length of the first side wall;
    a second side flange integrally connected to the second side wall and extending for an entire length of the second side wall;
    multiple mounting flanges integrally and frangibly connected to and extending away from each of the first and second side flanges, each of the mounting flanges having an elongated aperture; and
    multiple equally spaced and parallel slots created in a surface of the body pan.

9. The conveyor underguard of claim 8, wherein the first side flange is flush with respect to an upper perimeter surface of the first and second side walls and the first and second end walls.

10. The conveyor underguard of claim 8, wherein the first and second side flanges define co-planar surfaces which are co-planar with respect to an upper perimeter surface of the body pan.

11. The conveyor underguard of claim 8, further including a V-shaped slot defining a frangible intersection of each mounting flange and an outer edge of either the first or second side flange, any of the mounting flanges removable by repeated bending at the V-shaped slot.

12. The conveyor underguard of claim 8, wherein each elongated aperture includes opposed first and second end wall raised ribs and opposed first and second side wall raised ribs.

13. The conveyor underguard of claim 8, wherein the slots define a visual guide for a location to cut the body pan when it is desirable to reduce a length of the body pan.

14. The conveyor underguard of claim 8, further including a raised ring provided about a perimeter of the elongated aperture of each of the mounting flanges.

15. A conveyor underguard, comprising:
    a planar body pan integrally connected to opposed first and second side walls and to first and second end walls;
    a first side flange integrally and frangibly connected to the first side wall by a first elongated slot and extending for an entire length of the first side wall;
    a second side flange integrally and frangibly connected to the second side wall by a second elongated slot and extending for an entire length of the second side wall;
    multiple mounting flanges integrally and frangibly connected to and extending away from each of the first and second side flanges, each of the mounting flanges having an elongated aperture; and
    multiple equally spaced and parallel slots created in a surface of the body pan.

16. The conveyor underguard of claim 15, wherein an inner wall of each elongated aperture includes opposed first and second end wall raised ribs facing each other and directed inwardly with respect to the inner wall.

17. The conveyor underguard of claim 16, wherein the inner wall of each elongated aperture further includes opposed first and second side wall raised ribs facing each other and directed inwardly with respect to the inner wall.

18. The conveyor underguard of claim 15, wherein the body pan includes a plurality of apertures reducing a weight of the conveyor underguard.

19. The conveyor underguard of claim 15, wherein the body pan includes a center rib integrally connected to the body panel having a gusset at opposed ends of the center rib connected to one the first or second end walls.

20. The conveyor underguard of claim 19, wherein the body pan includes multiple cross ribs integrally connected to the body panel and integrally connected to the center rib, each of the cross ribs having a gusset at opposed ends integrally connected to one of the first or second side walls.

21. The conveyor underguard of claim 20, wherein the cross ribs are oriented normal with respect to the center rib.

22. A conveyor underguard, comprising:
a polymeric material planar body pan integrally connected to opposed first and second side walls and to first and second end walls;
a first side flange integrally and frangibly connected to the first side wall by a first elongated slot;
a second side flange integrally and frangibly connected to the second side wall by a second elongated slot;
multiple cross ribs integrally connected to the body pan; and
multiple equally spaced and parallel slots created in a surface of the body pan oppositely directed with respect to the cross ribs, each of the slots positioned proximate to and parallel with one of the cross ribs.

23. The conveyor underguard of claim 22, further including multiple mounting flanges integrally and frangibly connected to and extending away from each of the first and second side flanges.

24. The conveyor underguard of claim 23, wherein each of the mounting flanges includes an elongated aperture.

25. The conveyor underguard of claim 24, further including a raised ring provided about a perimeter of the elongated aperture of each of the mounting flanges.

26. The conveyor underguard of claim 24, wherein an inner wall of each elongated aperture includes:
opposed first and second end wall raised ribs facing each other and directed inwardly with respect to the inner wall; and
opposed first and second side wall raised ribs facing each other and directed inwardly with respect to the inner wall.

27. The conveyor underguard of claim 22, wherein each of the first and second side flanges extends for an entire length of the first or second side wall.

* * * * *